(12) United States Patent
Park

(10) Patent No.: US 6,363,458 B1
(45) Date of Patent: Mar. 26, 2002

(54) ADAPTIVE GRANULARITY METHOD FOR INTEGRATION OF FINE AND COARSE COMMUNICATION IN THE DISTRIBUTED SHARED MEMORY SYSTEM

(75) Inventor: Dae-Yeon Park, Taejon (KR)

(73) Assignee: Korea Advanced Institute of Science and Technology, Taejon (KR)

( * ) Notice: Subject to any disclaimer, the term of this patent is extended or adjusted under 35 U.S.C. 154(b) by 0 days.

(21) Appl. No.: 09/257,892

(22) Filed: Feb. 25, 1999

(30) Foreign Application Priority Data

May 19, 1998 (KR) ............................................. 98-17927

(51) Int. Cl.[7] ............................................. G06F 12/00

(52) U.S. Cl. .......................... 711/141; 711/147; 709/213
(58) Field of Search ................................. 711/141, 147; 709/213

(56) References Cited

U.S. PATENT DOCUMENTS 5,617,537 A    4/1997   Yamada et al. ......... 395/200.01

*Primary Examiner*—Kevin Verbrugge
(74) *Attorney, Agent, or Firm*—Bachman & LaPointe, P.C.

(57) ABSTRACT

An Adaptive Granularity type communication protocol to integrate fine and coarse communication in a distributed shared memory which makes it possible to actively process depending on the communication data size between respective nodes.

4 Claims, 7 Drawing Sheets

| Arc | Msg. Type | Condition | Action | Out Message |
|---|---|---|---|---|
| Local Cache ⇒ Node Controller ||||| 
| 1 | LOAD | NCPT[($p,i$)].s==INVALID | determine type | RREQ ⇒ home |
| 2 | STORE | NCPT[($p,i$)].s==INVALID | determine type | WREQ ⇒ home |
| 3,4 | LOAD,STORE | NCPT[($p,i$)].s==READ.TRANSIT \|\| NCPT[($p,i$)].s==WRITE.TRANSIT | | |
| 5 | LOAD | NCPT[($p,i$)].s==READ.ONLY | NCPT[($p,i$)].f=YES | |
| 6 | STORE | NCPT[($p,i$)].s==READ.ONLY | determine type | WREQ ⇒ home |
| 7 | LOAD,STORE | NCPT[($p,i$)].s==READ.WRITE | NCPT[($p,i$)].f=YES | |
| 8,9 | REPR,REPW | | NCPT[($p,i$)].f=NO | |
| Home Node ⇒ Local, Remote Node ||||| 
| 10,11 | RDATA | | NCPT[($p,i$)].f=YES NCPT[($p,s..e$)].s=READ.TRANSIT | |
| 12 | RDATAM | type==BULK | | |
| 13,14 | WDATA | | NCPT[($p,i$)].f=YES NCPT[($p,s..e$)].s=WRITE.TRANSIT | |
| 15 | WDATAM | type==BULK | | |
| 16 | INV | NCPT[($p,i$)].s==READ.ONLY | NCPT[($p,s..e$)].s=INVALID | ACK ⇒ home |
| 17 | INV | NCPT[($p,i$)].s==READ.WRITE | NCPT[($p,s..e$)].s=INVALID | WACK ⇒ home |
| 18,19 | INV | NCPT[($p,i$)].s==READ.TRANSIT \|\| NCPT[($p,i$)].s==WRITE.TRANSIT | | ACK ⇒ home |
| 20 | BUSY | NCPT[($p,i$)].s==WRITE.TRANSIT | determine type | RREQ ⇒ home |
| 21 | BUSY | NCPT[($p,i$)].s==READ.TRANSIT | determine type | WREQ ⇒ home |
| 22 | WSHIP | | NCPT[($p,s..e$)].s=READ.WRITE | |
| Local, Remote Node ⇒ Home Node ||||| 
| 31 | RREQ | D[($p,0$)].s==EMPTY | D[($p,0$)].g=$N$; D[($p,0$)].c=1 D[($p,0$)].m=local | RDATA ⇒ local (RDATAM,$N$) ⇒ local |
| 32 | WREQ | D[($p,0$)].s==EMPTY | D[($p,0$)].g=$N$; D[($p,0$)].c=1 D[($p,0$)].m=local | WDATA ⇒ local (WDATAM,$N$) ⇒ local |
| 33 | RREQ | D[($p,d$)].s==READ.ONLY | d=search.dir($i$); D[($p,d$)].c++; D[($p,d$)].m ∪ = local; $gs$ =D[($p,d$)].g | RDATA ⇒ local (RDATAM,$gs$) ⇒ local |
| 34 | WREQ | D[($p,d$)].s==READ.ONLY | d=search.dir($i$); ($d_1,d_2$)=split.dir ($d$); D[($p,d_1$)].a= d[($p,d_1$)].c; D[($p,d_1$)].c= 1; D[($p,d_1$)].m= local | INV ⇒ D[($p,d_1$)].m |
| 35,36 | WREQ,RREQ | D[($p,d$)].s==READ.WRITE | d=search.dir($i$); ($d_1,d_2$)=split.dir ($d$); D[($p,d_1$)].a= 1; D[($p,d_1$)].c=1; D[($p,d_1$)].m= local | INV ⇒ D[($p,d_1$)].m |
| 37,38 | RREQ,WREQ | D[($p,d$)].s==READ.TRANSIT \|\| D[($p,d$)].s==WRITE.TRANSIT | d=search.dir($i$) | BUSY ⇒ local |
| 39 | WREQ | D[($p,d$)].c==1 && D[($p,d$)].m== local | d=search.dir($i$) | WSHIP ⇒ local |
| 40 | ACK,WACK | D[($p,i$)].a==1 | D[($p,i$)].a--;merge.dir()? $gs$=D[($p,i$)].g | WDATA ⇒ D[($p,d$)].m (WDATAM,$gs$) ⇒ D[($p,i$)].m |
| 41 | WACK | D[($p,i$)].a==1 | D[($p,i$)].a--;merge.dir()? $gs$=D[($p,i$)].g | RDATA ⇒ D[($p,d$)].m (RDATAM,$gs$) ⇒ D[($p,i$)].m |
| 42 | ACK | D[($p,i$)].a>1 | D[($p,i$)].a-- | |

FIG. 3

ADAPTIVE GRANULARITY METHOD FOR INTEGRATION OF FINE AND COARSE COMMUNICATION IN THE DISTRIBUTED SHARED MEMORY SYSTEM

BACKGROUND OF THE INVENTION

1. Field of the Invention

The present invention relates generally to a Distributed Shared Memory (DSM) system, and more particularly, to a communication protocol to transfer/receive data between respective nodes.

Furthermore, the present invention relates to a new Adaptive Granularity type communication protocol to integrate fine- and coarse communication in a distributed shared memory which makes it possible to actively process depending on the communication data size between respective nodes. According to the present invention, it is possible to obtain standard load-store communication performance by employing cache line transfer for fine-grain sharing and bulk transfer performance by supporting spectrum granularity for bulk transfer.

Generally speaking, Distributed Shared Memory system is a noteworthy system as a recent multiprocessor system owing to its large expandability and programmability. In addition, most hardware distributed shared memory machines (DSM) achieve high performance by allowing the caching of shared writable data as well as read-only data.

The descriptions of the general concept for the above Distributed Shared Memory system are as follows, with reference to accompanied FIG. 1.

Distributed Shared Memory system is a multiprocessor computer system in which respective node can refer to memory of other nodes (i.e., distributed memory) as if it were its own memory. This architecture is a cache coherence management basis DSM system. Hence, one node in cache coherence management basis DSM system can refer to the memory of other nodes. It means that DSM system makes it possible to obtain good performance by storing the block referred to the memory of remote nodes in its cache and referring to the data in its cache without direct referring to the memory of remote nodes when it is necessary to refer to the above certain block.

However, if the corresponding cache line of certain node are modified by the certain node when the respective nodes share the memory block of home node, then the nodes with unchanged data are forced to refer to the old, unchanged data. Therefore, implementing cache in respective node introduces problem.

To solve the above problem, many cache coherence protocols are implemented. With reference to FIG. 1, respective nodes (NA, NB, NC, . . . , NK) are tightly connected to each other by Interconnect Network: IC Net) (This network is developed to speed up the message transfer.). In this case, k-array n-cube network, wormhole route network are included in the preferred example for the above IC Net.

The inner structure of the respective nodes is similar to those of prior uniprocessor (e.g., personal computer, Sparc20, and so on) as referred to by NK in FIG. 1, but respective node has node controller and directory to support DSM.

When read/write miss for cache happens in one node, the node controller transfers request to home node for cache coherence management. If reply for the request is transferred from home node, then the controller handles the corresponding protocols.

In addition, directory must have the information of its own memory sharing state in order to keep the cache coherence. Of course, the number of directory entries must be large enough to meet the number of respective blocks one by one, and the above entry stores the number of node sharing this memory block. If other node tries to change the memory block of home node, then the other node must acquire write approval from the home node and the home node transfers invalidation requests to all nodes sharing the corresponding block before write approval transfer. If the home node has received all acknowledge messages, then the home node transfers write approval to write requesting node.

The above briefly described protocol is a Hardware DSM Protocol (HDP), and a transfer/receive protocol for fine-grain.

Therefore, one disadvantage of this kind of cache-coherent machine is that they use a fixed size block (i.e., a cache line for loads and stores) as a way of a communication. While this works well for fine-grain data, on some application, another communication program the characteristics of which is parallelism can sometimes be more effective than caching permitting for data bulk transfer.

Hence, to solve the described problems, a method supporting above two types simultaneously, i.e., the method for using all advantages of fine- and coarse-grain communications is supposed recently and the brief descriptions of it are as follows.

More recent shared memory machines have begun to integrate both models within a single architecture and to implement coherence protocols in software rather than in hardware. In order to use the bulk transfer facility on these machines, several approaches have been proposed such as explicit messages and new programming models. In explicit message passing communication primitives such as send-receive or memory-copy are used selectively to communicate coarse-grain data, while load-store communication is used for fine-grain data. In other words, two communication paradigms coexist in the program and it is the user's responsibility to select the appropriate model.

Though these two approaches support an arbitrarily variable granularity and thus may potentially lead to large performance gains, they suffer from decreased programmability and increased hardware complexity. In other words, there is a tradeoff between the support of arbitrary size granularities and programmability.

SUMMARY OF THE INVENTION

The primary objects of the present invention to solve the prior problems is to provide a new Adaptive Granularity type communication protocol to integrate fine and coarse communication in a distributed shared memory which makes it possible to actively process on communication protocol setting depending on the communication data size between respective nodes. According to the present invention, it is possible to obtain standard load-store communication performance by employing cache line transfer for fine-grain sharing and bulk transfer performance by supporting spectrum granularity for bulk transfer. In addition, by efficiently supporting the transparent bulk data communication, it is possible to reduce the programmer's burden for using variable-size granularity.

The present invention is characterized as a data communication method for reading/writing data between memories in a distributed shared memory system wherein said protocol selectively performs bulk transfer by supporting spectrum granularity for coarse-grain sharing or standard load-store transfer by employing cache line transfer for fine-grain sharing.

In accordance with the aspects of the present invention, a bulk data communication method of a data communication method for reading/writing data between memories in a distributed shared memory system is provided which comprises the steps of a) determining only the communication type without designating the requested data size according to the data type and transferring the request to the home node, when the node controller is instructed from local cache; b) determining the granularity depending on the sharing pattern and transferring the bulk data to the requesting node, when the home node receives the bulk request; c) adding the two blocks into one buddy when two adjacent blocks are owned to same node; and d) writing by the node controller only requested data in the cache line and the rests in local memory in order to use for future cache miss, when the data arrive.

Another object of the present invention is to provide a bulk data communication method which, after the step b), further comprises the step of dividing by the home node the block into two parts in order to reduce the false sharing when the ownership of the block is changed.

Another object of the present invention is to provide a data communication method from local or remote nodes to home node for reading/writing data between memories in a distributed shared memory system in which a plurality of nodes are connected on interconnection network, and said respective node comprises processors with certain functions, memories, caches and node controllers for communicating data between said node and another nodes, which comprises the states of INVALID state; READ TRANSIT state; WRITE TRANSIT state; READ ONLY state; and READ WRITE Wherein, the state transits to "INVALID" state when the cache line does not have the data to be referred (read/written) by processor, wherein a cache line fault handler requests bulk data transfer or fine data transfer to another node (remote computer or remote node), the state transits to "READ TRANSIT" state when the cache has not the corresponding data block while the processor tries to read certain memory block, wherein the node cache controller sends Read Data Request (RREQ) to the home node and then the state transits to "READ TRANSIT" state; the procedure is blocked in "READ TRANSIT" state until the data for corresponding block are transferred; and the state of the cache line transits to "READ ONLY" state when the home node has transferred the requested data and the data are loaded to the fault cache line, the state transits to "WRITE TRANSIT" state when the cache has not the corresponding data block while the processor tries to write certain memory block, wherein the node cache controller sends Write Data Request (WREQ) to the home node and then the state transits to "WRITE TRANSIT" state; the procedure is blocked in "WRITE TRANSIT" state until the data for corresponding block are transferred; and the state of the cache line transits to "READ WRITE" state when the home node has transferred the requested data and the data are loaded to the fault cache line, the state transits to "READ ONLY" state when the home node has transferred the corresponding block in "READ TRANSIT" state, wherein if the state of corresponding cache line is "READ ONLY" state, it means that the memory data of home node are shared; and if another node attempts to write the same memory data of the home node and the home requests INV request, then the state of corresponding line returns to "INVALID" state, and the state transits to "READ WRITE" state when the home node has transferred the corresponding block and write approval and then the data have been stored in the fault cache line in said "WRITE TRANSIT" state, wherein if the state of one cache line is "READ WRITE" state, then this node has ownership for the memory data of home node; if another node requests to write this memory data of home node, then the home node sends INV request (invalidate request) to the node having the ownership and being in "READ WRITE" state; and the INVALID requested node returns the state of the corresponding cache line to "INVALID" state.

Another object of the present invention is to provide a data communication method from home node to local or remote nodes for reading/writing data between memories in a distributed shared memory system in which a plurality of nodes are connected on interconnection network, and said respective node comprises processors with certain functions, memories, caches and node controllers for communicating data between said node and another nodes, which comprises the states of EMPTY state; READ ONLY state; READ WRITE; READ TRANSIT state; and WRITE TRANSIT state, wherein the state transits to "EMPTY" state when read/write request is sent to the home node, wherein said "EMPTY" state means the protocol state of directory when the page for requested data is referred; the home node refers to the directory having the corresponding data storing memory information, determines whether the corresponding data are bulk transfer data or fine transfer data depending on the information, sends first the requested cache line to the requesting node, and then transfers the rest data of the page as a sequence of cache lines, the state transits to "READ ONLY" state after transferring the corresponding requested data, wherein the requested specific cache line size data are sent first to the node requesting said specific data in home node and the rest contents of the page including the requested specific data are transferred as a sequence of cache lines; if the RREQ for the same block is sent to the home node, then the directory for the requested data is referred and the corresponding cache line size block is transferred to the requester; and if the above requesting is for bulk data transfer, then the whole page including the block is sent to the requester, the state transits to the "READ WRITE" state when WREQ is transferred from another node in "READ ONLY" state, wherein, when the request to the home node in bulk data requesting, write data request WREQ requests the change of the data ownership; the home node transfers the half of the page including this data to the requester, so not only the requester has the ownership of the transferred half page, but also the data except for the requested cache line are used for future; INV (invalidate request) is sent to another node having the half of transferred block in order to maintain the cache coherency; and the state of home node transits from "READ WRITE" state to "EMPTY" state, the state transits to "READ TRANSIT" state when the home node waiting ACKs receives the RREQ for the same block from another node, wherein the home node waits until it receives all ACKs; if the home node receives all ACKs for the invalidate requests, then the state transits to "READ WRITE" state; and the home node handles the RREQ/WREQ received in "READ TRANSIT" state, and the state transits to "WRITE TRANSIT" state when the home node waiting ACKs receives the WREQ, wherein if the home node receives all ACKs for the invalidate requests, then the home node again handles the RREQ/WREQ received while it waits ACKs.

BRIEF DESCRIPTION OF THE DRAWINGS

The accompanying drawings, which are included to provide a further understanding of the invention, illustrate a preferred embodiment of this invention, and together with the description, serve to explain the principle of the present invention.

In the drawings:

FIG. 3 is a state transition table for the AG protocol;

DETAILED DESCRIPTION OF THE PREFERRED EMBODIMENTS

Figure 1:
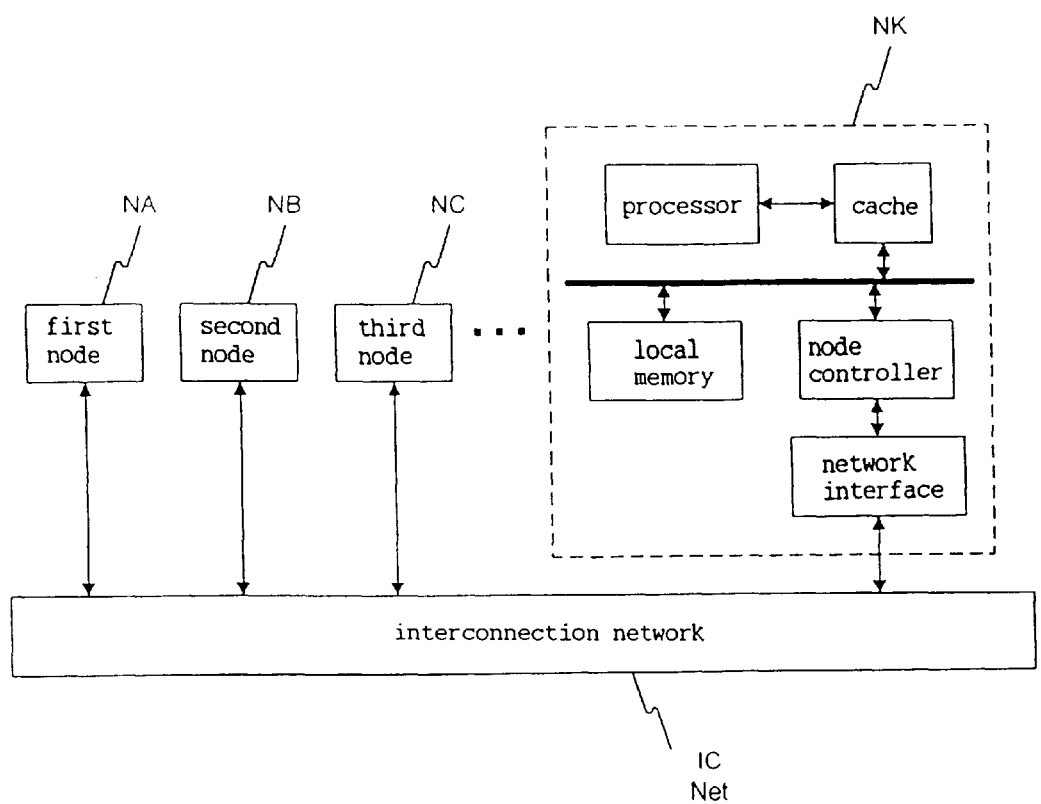
FIG. 1 is a illustrative block diagram to explain the concepts of a general Distributed Shared Memory system.

The preferred embodiments according to the present invention are described below in detail with reference to the accompanying drawings.

First, the granularity of shared data is described before the concepts and characteristics of adaptive granularity used in the present invention are described. In principle, the granularity of shared data can be arbitrary: word, cache line, page, complex data structure, etc. There are two main factors affecting the optimal granularity: false sharing and spatial locality. False sharing occurs when different processors access different locations within the same block (grain) of data. This causes the data to bounce back and forth between the corresponding caches as if it were truly being shared. As the size of a grain of data (granularity) increases, the probability of false sharing goes up even when more spatial locality can be exploited.

The main idea behind Adaptive Granularity (AG) is the use of a coherency protocol that allows programs to transparently and dynamically set the grain size of shared data base on the access patterns of individual nodes. We start by distinguishing between two classes of data: large arrays (bulk data) and small arrays and scalar data (normal data). The granularity of normal data is always the cache line, while an adaptive scheme for determining the optimal grain size is applied to bulk data.

Furthermore, Adaptive Granularity according to the present invention integrates transparently bulk data transfer in DSM model, i.e., programmer does not take any action for bulk data transfer. The major characteristics of the above Adaptive Granularity is that it supports variable-size granularity and memory replication, but does not sacrifice shared memory characteristics of program flexibility. AG supports limited, but flexible granularity combination, i.e., from cache line size to page size, for variable size granularity. This method makes it possible to effectively support bulk data transfer without requesting additional hardware.

In this case, the term "granularity" is defined as a sharing unit, i.e., sharing unit to share data between individual computers or nodes in multicomputer system. For example, cache line or page corresponds to the sharing unit.

Therefore, the Adaptive Granularity protocol according to the present invention consists of two protocols: one for fine-grain data and the other for bulk data. That is to say, Adaptive Granularity protocol consists of hardware DSM protocol and bulk data protocol.

For small size data where accesses are always fine-grain, the standard invalidation-based hardware DSM protocol (HDP) is used and the granularity is a cache line. For large size data where access patterns are difficult to predict, the Bulk Data Protocol (BDP) is used and the granularity varies depending on the runtime sharing behavior. The BDP and HDP protocols are quite similar in the number of states and state transitions, but the BDP efficiently supports variable granularity size.

Therefore, for scalar data and array data, the standard hardware DSM protocol is used and the granularity is fixed to a cache line. For large array data, the protocol for bulk data is used and the granularity varies depending on the sharing behavior at runtime. The brief descriptions of the bulk data protocol are as follows.

Figure 2A:
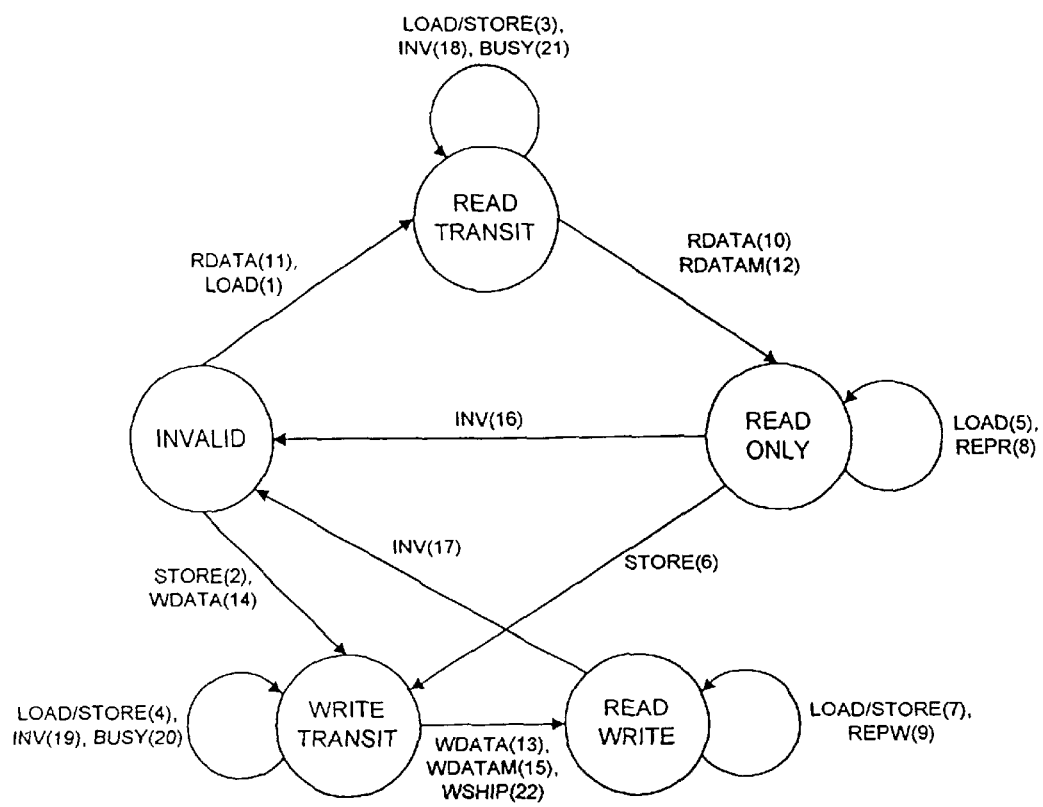
FIG. 2a is a diagram related to protocol transition for local/remote nodes.
Figure 2B:
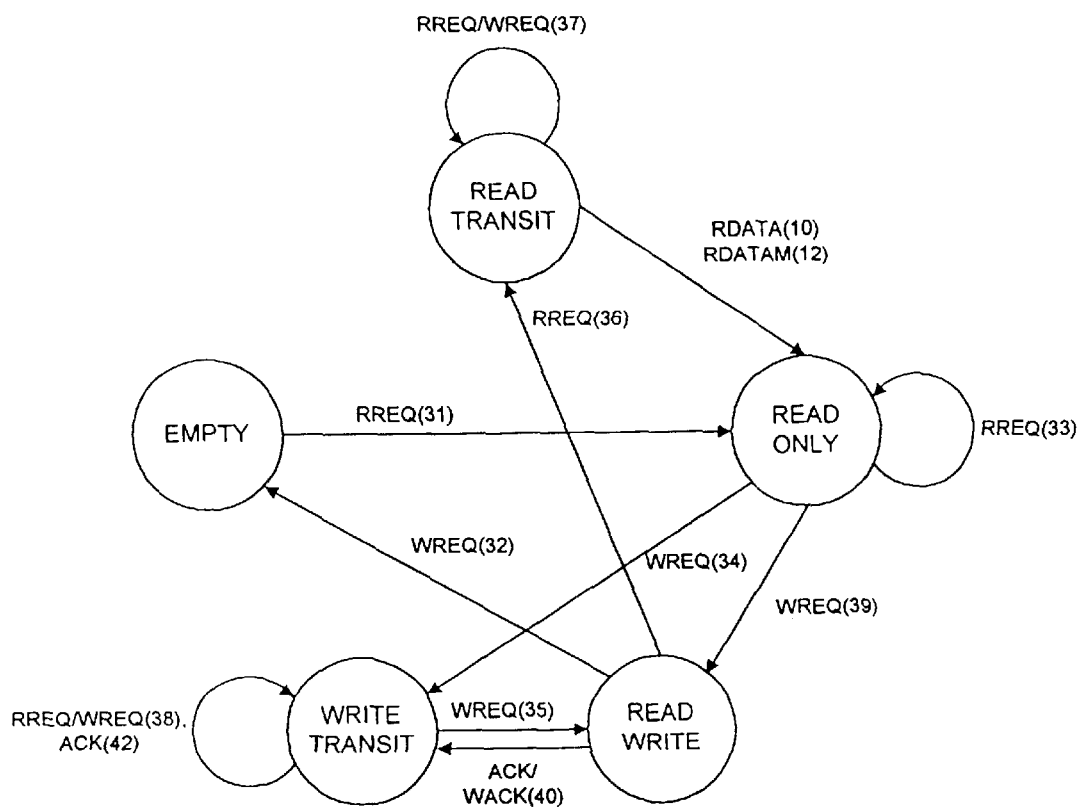
FIG. 2b is a diagram related to protocol transition for home node.

The accompanied FIG. 2a and 2b illustrate diagrams related to state integration for Adaptive Granularity. FIG. 2a is a diagram related to protocol integration for local/remote nodes and FIG. 2b is a diagram related to protocol integration for home node.

In this case, the signal type shown in FIG. 2a and FIG. 2b, i.e., the message type between local/remote node and home node are illustrated in following Table 1.

TABLE 1

Message types sent by local, home, and remote nodes.

| Signal Transfer Direction | Signal Name | Signal Characteristics |
|---|---|---|
| Local, Remote Node ->Home node | RREQ | Read data request |
| | WREQ | Write data request |
| | ACK | Acknowledges invalidate |
| | WACK | Ack. write inv. and returns data |
| Local Cache ->Local Node Controller | REPR | Read data was replaced |
| | REPW | Write data was replaced |
| Home Node >Local. Remote Node | RDATA | Read data response |
| | WDATA | Write data response |
| | RDATAM | Sending rest of bulk read data |
| | WDATAM | Sending rest of bulk write data |
| | WSHIP | Ownership change |
| | BUSY | Transit state |
| | INV | Invalidate data request |

The operations of local/remote node and home node with reference to FIG. 1, FIG. 2a and 2b are as follows.

In this case, the present invention of which state diagrams are shown in FIG. 2a and 2b employs the cache coherence management protocols for prior distributed shared memory multiprocessor computer system. More specifically, HDP adopted in the prior distributed shared memory system is used for fine-grain communication and new protocol for bulk data transfer is additionally used.

In other words, the descriptions except for bulk data transfer with reference to the above state diagram are identical to the data transfer protocols for fine-grain data. However, the additional functions for bulk request are included for bulk data transfer.

FIG. 2a shows the respective states of cache in local/remote nodes and FIG. 2b shows the corresponding directory states of home node to the protocol operations of local/remote node.

First, the operations in the local/remote nodes are described. The local/remote node consistently use the NCPT (Node Controller Page Table) by performing the integrating diagram as shown in FIG. 2a.

The operation characteristics in each state are as follows. When the cache line does not have the data to be referred by processor (the state of cache line to be referred is invalid state), the state transits to "INVALID" state. At this time, cache line fault handler requests bulk data transfer or fine data transfer to another node (remote computer or remote node). If the processor shown in FIG. 2a was instructed by only load/store command, then RREQ or WREQ is sent to the home node by the node controller. As following descriptions shown, the home node starts at "EMPTY state" in case of first requesting for the above cache line.

If the cache has not the corresponding data block when the processor tries to read certain memory block, then the state transits to "READ TRANSIT" state. The node cache controller sends Read Data Request (RREQ) to the home node and transits to "READ TRANSIT" state. At this time, the procedure is blocked in "READ TRANSIT" state until the data for corresponding block are transferred (blocking: Waiting state without operation for the corresponding block reference request). If the home node has transferred the requested data (RDATA/RDATAM in FIG. 2a) and the data are loaded to the fault cache line, then the state of the cache line transits to "READ ONLY" state. If the home node transfers the other half block including the data simultaneously in case of fault cache line for bulk data transfer, then the state must remain in "READ TRANSIT" state until the other half block is completely sent. Therefore, if the bulk data have been transferred completely, then the state transits to "READ ONLY" state.

Furthermore, the descriptions of "WRITE TRANSIT" state are identical to those of "READ TRANSIT" state except for the transition state in not reading but writing. Of course, if the home node transfers the corresponding block and write approval and the data have been read in the fault cache line, then the state of cache line transits to "READ WRITE" state. If the home node transfers the other half block including the data simultaneously in case of fault cache line for bulk data transfer, then the state must remain in "WRITE TRANSIT" state until the other half block is completely sent. Therefore, if the bulk data have been transferred completely, then the state transits to "READ ONLY" state.

If the home node has transferred the corresponding block in "READ TRANSIT" state, then the state transits to "READ ONLY" state. When the state of corresponding cache line is "READ ONLY" state, it means that the memory data of home node are shared. If another node attempts to write the same memory data of the home node and so the home node requests INV request, then the state of corresponding line returns to "INVALID" state.

Furthermore, when the home node has transferred the corresponding block and write approval and then the data have been stored in the fault cache line, the state transits to "READ WRITE" state. If the state of one cache line is "READ WRITE" state, then this node has ownership for the memory data of home node. If another node requests to write this memory data of home node, then the home node sends INV request (invalidate request) to the node with the ownership and being in "READ WRITE" state. The requested node (This node has had the ownership for this block until now.) returns the state of the corresponding cache line to "INVALID" state. Therefore, this node does not have the ownership any more for the cache block invalidated.

Therefore, once a virtual page has been mapped to local physical memory, the first access to a cache line tagged INVALID results in the execution of a line-access-fault handler. The handler retrieves the home node's ID and launches a bulk or normal request. This situation is represented by arcs 1 and 2 in FIG. 2a. At home node, the message invokes a handler that performs the appropriate coherence action and returns the data. It does this by sending first the requested cache line, and for a bulk data transfer the rest of the block as a sequence of cache lines.

Doing this utilizes efficiently the memory and network bandwidths. When the requested cache line arrives, the corresponding message handler writes the data into the cache and changes the line's access state to either READ_ONLY or READ_WRITE. In addition, for a bulk transfer, the handler also changes the state of the expected data to the TRANSIT state so that future accesses to data in this block are suspended until the line in question arrives.

This avoids sending unnecessary requests to the home node. This situation is represented by arcs 10, 11, 13 and 14. When the rest of the bulk data arrives a line at a time (arcs 12 and 15), the message handlers write it into local memory and change its state.

The operation states in local/remote node have been described as above. Next, the operation states in the home node are described with reference to FIG. 2b. In this case, the table representing the state transition table for Adaptive Granularity protocol and shown in FIG. 3 is referred below descriptions of the operations in local/remote node and home node.

First, the descriptions of the respective states shown in FIG. 2b are as follows. If the read/write request is sent to the home node, then the home node refers to the directory with the corresponding data storing memory information. At this time, whether the corresponding data are bulk transfer data or fine transfer data is determined depending on the information. The protocol state of directory is "EMPTY" state when the page for requested data is referred first in home node as above. The meaning of this state is that the requested cache line is sent first to the requesting node, and then the rest data of the page are transferred as a sequence of cache lines. At this time, the state of home node transits to "READ ONLY" state after transferring the corresponding requested data.

In "READ ONLY" state, the requested specific cache line size data are sent first to the node requesting the data in home node and the rest contents of the page including the requested specific data are transferred as a sequence of cache lines. Thereafter, if the RREQ for the same block is sent to the home node, then the directory for the requested data is referred and the corresponding cache line size block is transferred to the requester. At this time, if the above requesting is for bulk data transfer, then the whole page including the block is sent to the requester.

The descriptions of the "READ WRITE" state are as follows. If WREQ is transferred from another node in "READ ONLY" state, the state transits to the "READ WRITE" state. When the request to the home node in bulk data requesting, WREQ, requests the change of the data ownership (i.e., the requester requests the ownership of data), the home node transfers the half of the page including this data to the requester, and so the requester has the ownership of the transferred half page as well. In addition, the data except for the requested cache line are also used for future. It is notable that the requested cache line by the requester among the half page transferred in advance is stored immediately in the cache of the requester and the rests are stored in its local memory. If necessary, the data read in advance and stored in local memory are referred to instead of reading data from the memory of the other node, resulting in remarkable improvement of total performance. In order to keep the cache coherency, INV(invalidate request) is sent to the other node with the half of transferred block. In addition, the home node transits from "READ WRITE" state to "EMPTY" state. At this time, if the home node sends the INV request to other nodes in order to keep cache coherency, then the home must receive the acknowledge signal (ACK) to confirm invalidating. If the home node receives RREQ/WREQ for the corresponding data block from other nodes to which the home node does not transfer INV during the home node waits the ACK from the nodes with the above data block, then the state transits to "READ TRANSIT" state for RREQ and to "WRITE TRANSIT" state for WREQ and the protocol handling for the requested RREQ/WREQ stops until the home node has received all ACKs. However, the half block remained after transferring to other nodes can also be referred by requests from other remote nodes. Of course, the operations in "READ WRITE" state are repeated for bulk transfer request requiring ownership of data by transferring WREQ as above.

In "READ TRANSIT" state, if the home node waiting ACKs like aforementioned "READ WRITE" state receives the RREQ for the same block from other node, then the state transits to "READ TRANSIT" state and the home node waits until it receives all ACKs. Of course, if the home node receives all ACKs for the invalidation requests, then the state transits to "READ WRITE" state and the home node handles the RREQ/WREQ received in "READ TRANSIT" state.

In "WRITE TRANSIT" state, the operations are identical to those of "READ TRANSIT" state except for transition to "WRITE TRANSIT" state on receiving WREQ while the home node waits ACK for the invalidate requests. Of course, the home node handles again the RREQ/WREQ received while it waits ACKs.

Therefore, when the home node receives bulk requests, it takes similar actions to those of the standard hardware DSM protocol, as shown in the accompanied FIG. 2b. The only difference between HDP and BDP is with the way the directory is used. BDP uses an additional directory field (grain size) to support variable granularity.

Initially, the grain size of a memory block is set to the number of cache lines in a page (IN in the figures) and the representative directory entry for all data belonging to the same page is D[(p,0)].

When the home node receives RREQ or WREQ bulk messages with address (p.i), the home node directory handler first searches representative D[(p,0)], as shown in the accompanied FIG. 2b. With this scheme, the search can cost at most log2N, in the rare case when the page has been split into individual cache line, but directory operations such as split and merge are done efficiently. Furthermore, only two messages (RREQ and WREQ) need to search the directory; the other messages such as acknowledgments carry the associated address and size. This allows handlers to make direct accesses to the representatives.

After finding the correct representative entry in the directory, handler need to take some actions before they can send the bulk data. Specifically, the first time a page is accessed the state for D[(p,0)] is EMPTY and thus handlers send the whole page to the local nodes (the requested cache line is sent first and then the rest of the page as a sequence of cache lines). The representative's state is changed and the grain size is set to N (number of cache line per page). This situation is represented by arcs 31 and 32 shown in the accompanied FIG. 2b. When a bulk request requires an ownership change (e.g., READ_ONLY→READ_WRITE), the memory block is split into two subblocks (called buddies) of equal size. Only the ownership of the subblock containing the requested cache line is changed. Handlers send INV messages to all remote nodes caching the subblock and update the subblock representative entries. Note that the other half of the original block is left untouched so that remote nodes can continue to access it. This situation is illustrated by arcs 34, 35, and 36 in the transition diagram illustrated in the accompanied FIG. 2b.

When all acknowledgments finally arrive at the home node (arcs 40 and 41 in the accompanied FIG. 2b), the handler sends the subblock to the local nodes. At this time, if the block grain size is 1(minimum granularity), the handler checks the directories of the two buddies to see if merging is possible and this process continues provided adjacent buddies have the same state, are owned by the same node, and no other nodes are caching the data.

FIG. 3 is a table related to the protocol integration diagram shown in FIG. 2a and 2b, and the descriptions of several state in the data table shown in the accompanied FIG. 3 are as follows. In case of transition from "INVALID" state to "READ TRANSIT" state in the state table transferred from local cache to node controller, i.e., the message type is LOAD(1), NCPT[(p,I)] .s is INVALID state and so it means that, taking determining type operations, read data request signal (RREQ) is sent to the home node.

In another case of transition from "INVALID" state to "WRITE TRANSIT" state, i.e., the message type is STORE (2), NCPT[(p,I)] .s is INVALID state and so it means that, taking determining type operations, write data request signal (WREQ) is sent to the home node.

In this way, the data communications between nodes are performed depending on the respective message type and the state transitions are carried out.

In FIG. 3, NCPT[] .s means the state; NCPT[] .f means the cache present bit; N is the number of cache lines per page; D[] .s means the state; D[] .g is the grain-size; D[] .c means the node counter; D[] .m means the membership set; and D[] .a means the ACK counter.

The above protocol, i.e., the AG protocol consists of two protocols. One is for fine-grain data and the other is for bulk data. For scalar data and small size array data, the standard hardware protocol is used and the granularity is a cache line. For large size array data, bulk data protocol is used and the granularity varies depending on the runtime sharing behavior. The descriptions of the bulk data protocol are as follows.

When the node controller is instructed from local cache, only the communication type is determined without designating the requested data size according to the data type and the request is sent to the home node. If the home node receives the bulk request, the granularity is determined depending on the sharing pattern and the bulk data are transferred to the requesting node. In order to reduce the false sharing, the home node divide the block into two parts when the ownership of the block is changed.

In order to use more local space, if two adjacent blocks are owned to the same node, then the two blocks are added into one. When the data arrive, the node controller writes the only requested data in the cache line and the rests in local memory in order to use for future cache miss.

To put the above descriptions briefly, Adaptive Granularity according to the present invention makes it possible to transparently integrate bulk transfer into the shared memory model by supporting variable-size granularity and memory replication. It consists of two protocols: one for small data and another for large data. For small size data, the standard hardware DSM protocol is used and the granularity is fixed to the size of a cache line. For large array data, the protocol for bulk data is used instead, and the granularity varies depending to the sharing behavior of applications at runtime.

The present invention employs similar protocol and directories for Bulk Data Protocol. However, difference between HDP and BDP is that BDP implements additional factor in directory entry in order to efficiently support fine-communication and coarse-communication simultaneously. The factor is the grain size storing factor.

Figure 4:
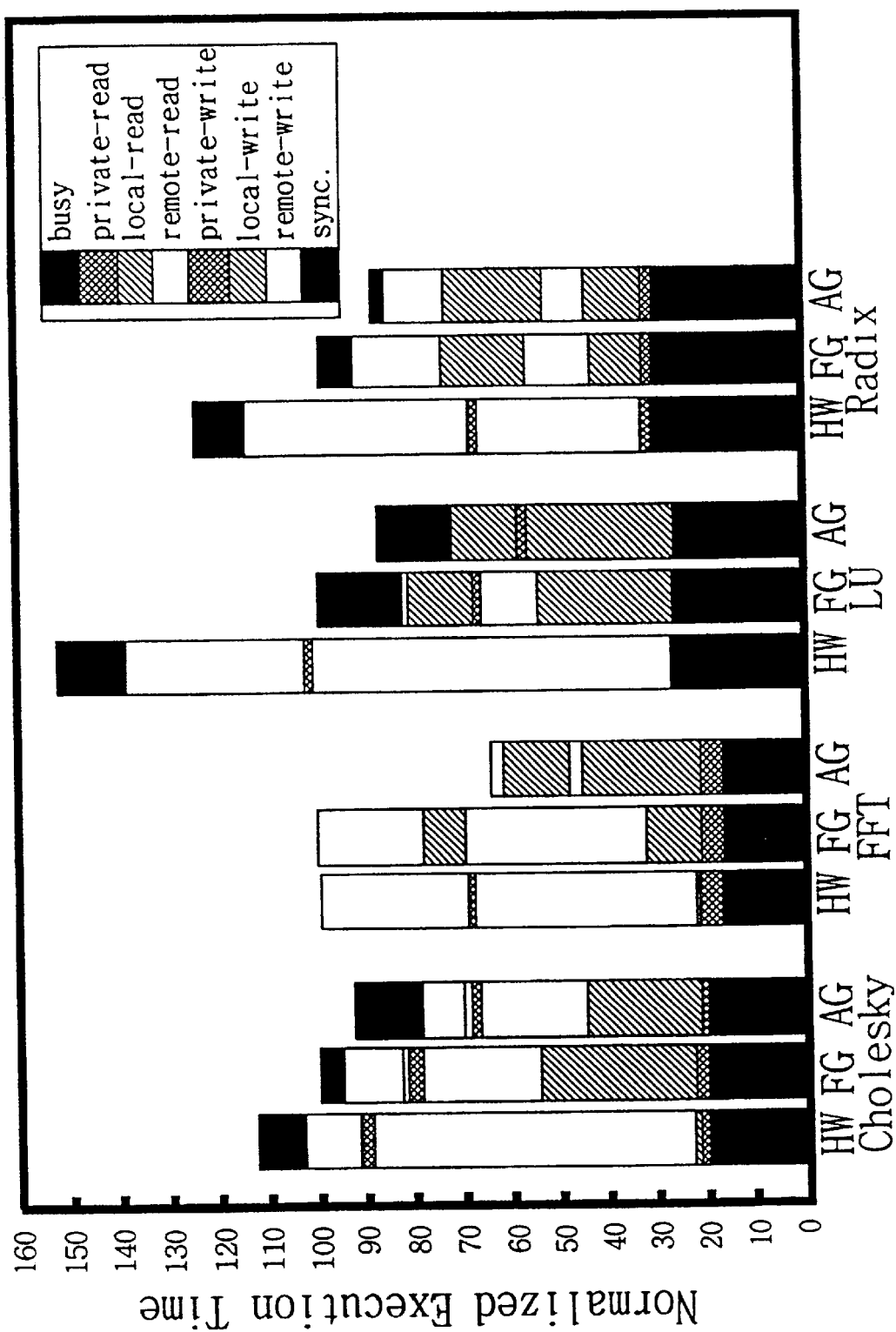
FIG. 4 is a simulation resulting graph for default machine parameters.
Figure 5:
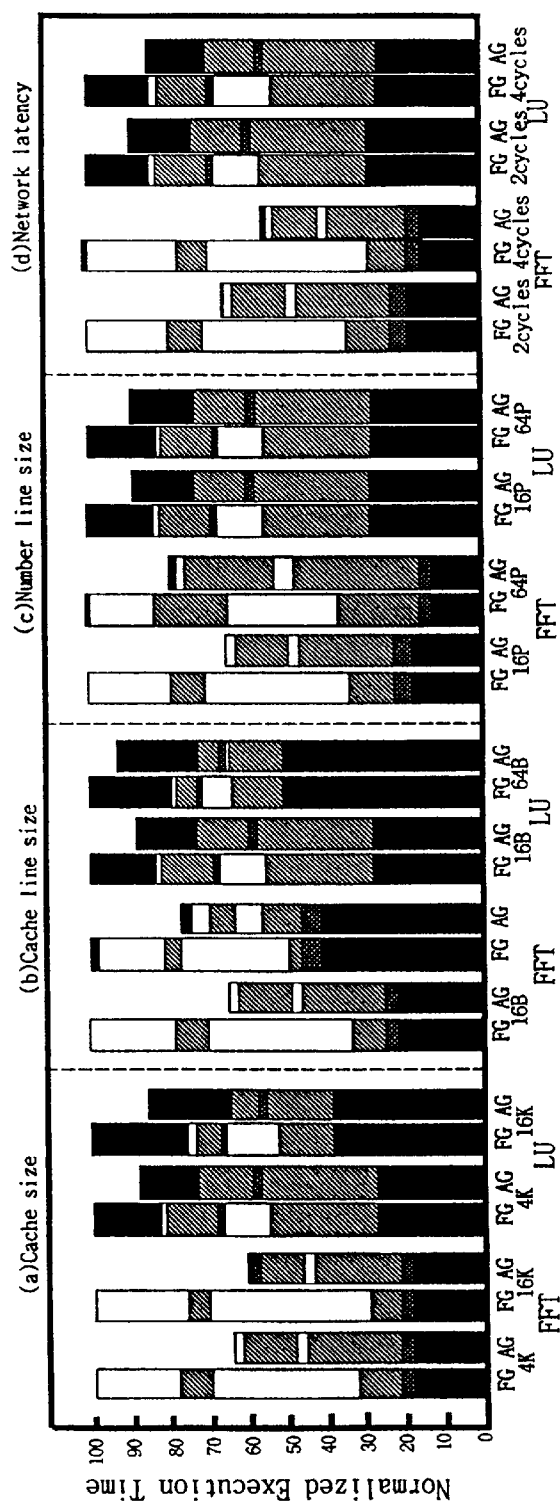
FIG. 5 is a simulation resulting graph showing effects of architectural parameter variation under the same conditions given in FIG. 4.
Figure 6:
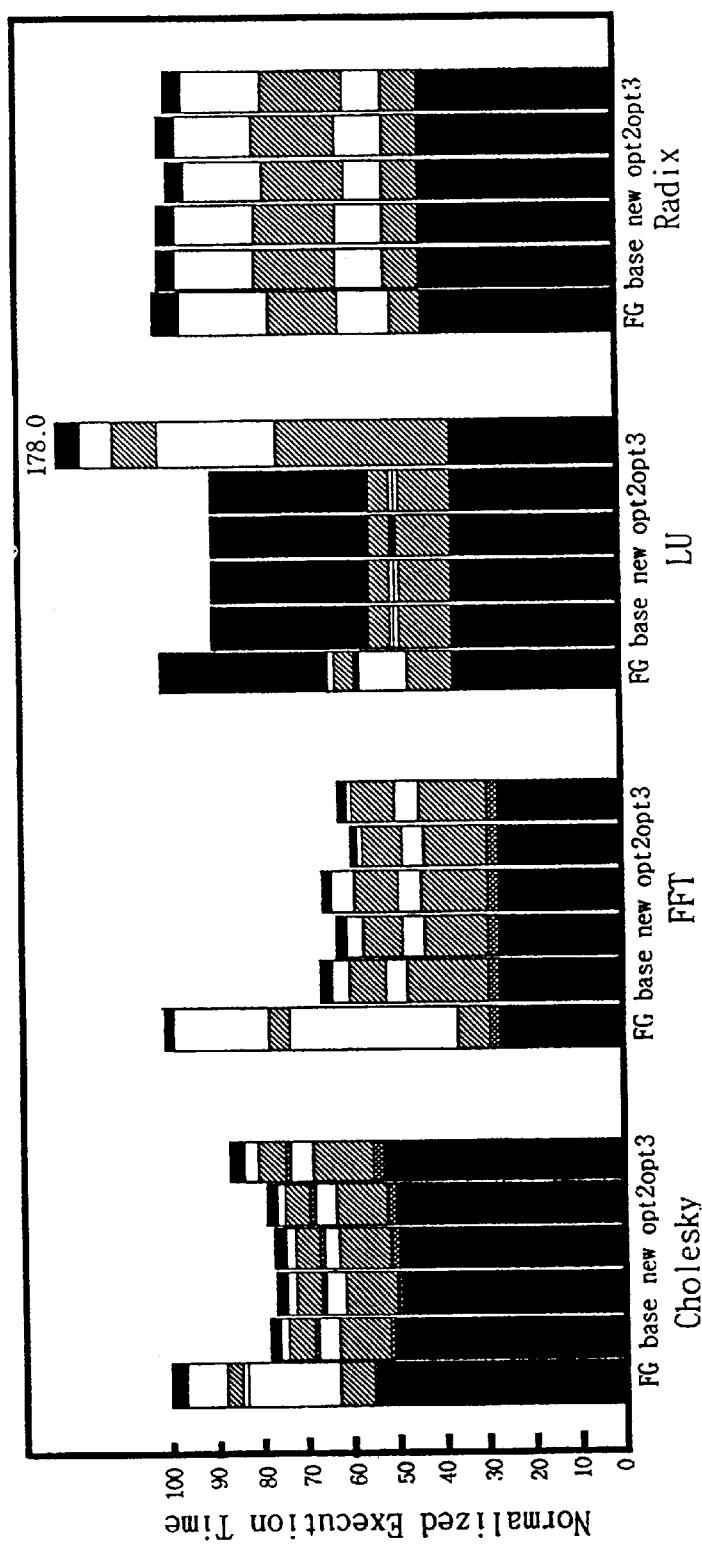
FIG. 6 is a simulation resulting graph showing effects of optimizations to the AD protocol base under the same conditions that given in FIG. 4.

Accordingly, simulation results for the present Adaptive Granularity to integrate fine- and coarse communication in distributed shared memory are as follows. With reference to FIG. 4–FIG. 6, FIG. 4 is a simulation resulting graph for default machine parameters, FIG. 5 is a simulation resulting graph showing effects of architectural parameter variation under the same conditions given in FIG. 4; and FIG. 6 is a simulation resulting graph showing effects of optimizations to the AG protocol base under the same conditions given in FIG. 4.

In these cases, parameters for respective simulations are as following Table 2.

TABLE 2

Simulation main parameter

| | | |
|---|---|---|
| Common Parameter | Memory consistency | sequential |
| | Memory access latency | 35 cycles |
| | CPU cache | direct-map |
| | Cache line size | 16 bytes |
| | Cache size | 4 Kbytes |
| | Page size | 4 Kbytes |
| | TLB miss | 25 cycles |
| | Switch delay | 2 cycles |
| | Wire delay | 2 cycles |
| | Channel width | 2 bytes |
| FG Handler Overhead | Memory request | 14 cycles |
| | Memory reply | 30 cycles |
| | Data arrival | 20 cycles |
| AG Handler Overhead | Memory request | 14 cycles |
| | Memory reply | 40 cycles |
| | Data arrival | 20 cycles |

In addition, the constitution characteristics for respective comparing programs are shown in following table 3.

TABLE 3

Application Characteristics

| Program | Description | Input Data Set |
|---|---|---|
| Cholesky | Sparse Cholesky factorization | Bcsstk 14 |
| FFT | Fast Fourier transformation | 64K complex points |
| LU | Blocked LU factorization | 260 × 260 |
| Radix | Integer radix sort | 256k keys, radix = 1024 |

Furthermore, simulation resulting analysis table for cache failure is as following table 4.

TABLE 4

Simulation results for default machine parameters.

| Pro-gram | Sys-tem | Miss Ratio | Contributions to Miss | | | | Private Rd + Wr |
|---|---|---|---|---|---|---|---|
| | | | Local | | Remote | | |
| | | | Reading | Writing | Reading | Writing | |
| Chole-sky | HW | 9.6 | 3.3 | 0.9 | 71.1 | 13.9 | 10.8 |
| | FC | 9.6 | 73.1 | 1.7 | 7.9 | 7.3 | 10.0 |
| | AG | 9.6 | 73.3 | 3.0 | 8.2 | 8.0 | 7.5 |
| FFT | HW | 18.6 | 3.1 | 2.0 | 49.3 | 32.9 | 12.7 |
| | FG | 18.6 | 28.7 | 23.1 | 23.6 | 11.9 | 12.7 |
| | AG | 18.6 | 51.2 | 34.3 | 1.2 | 0.6 | 12.7 |
| LU | HW | 11.6 | 1.1 | 0.0 | 63.8 | 32.9 | 2.2 |
| | FG | 11.6 | 58.9 | 31.9 | 6.0 | 1.0 | 2.2 |
| | AG | 11.6 | 64.7 | 32.9 | 0.2 | 0.0 | 2.2 |
| Radix | HW | 8.8 | 1.4 | 2.1 | 41.5 | 51.4 | 3.6 |
| | FG | 8.8 | 35.4 | 42.0 | 7.4 | 11.2 | 4.0 |
| | AG | 8.8 | 38.9 | 49.2 | 3.9 | 4.0 | 4.0 |

Therefore, with reference to FIG. 4 to FIG. 6 among the accompanying figures and table 2 to table 4, the AG according to the present invention improves performance up to 43% over a hardware implementation of DSM.

Compared with an equivalent architecture that supports fine-grain memory replication at the fixed granularity of a cache line, AG reduces execution time up to 35%.

Like as above detailed descriptions, the present Adaptive Granularity to integrate fine- and coarse communication in distributed shared memory makes it possible to use the advantage of bulk transfer by supporting spectrum granularity for coarse-grain sharing and standard load-store communication by employing cache line transfer for fine-grain sharing.

Furthermore, by efficiently supporting the transparent bulk data communication to distributed shared memory model, it is possible to solve the important problem which makes the prior method amend the program for efficient communication and to simultaneously support fine- and coarse-grain communication without amending program.

The present invention has been described with reference to particular embodiments in connection with a particular application. Those having ordinary skill in the art and access to the teachings of the present invention will recognize additional modifications and applications are within the scope of the present invention. It is therefore intended by the appended claims to cover any and all such applications, modifications, and embodiments within the scope of the present invention.

What is claimed is:

1. A bulk data communication method of a data communication method for reading/writing data between memories using an Adaptive Granularity protocol to integrate fine and coarse communication in a distributed shared memory system in which a plurality of nodes are connected on interconnection network, and said respective node comprises processors with certain functions, memories, caches and node controllers for communicating data between said node and other nodes, comprising the steps of:

a) determining only the communication type without designating the requested data size according to the data type and transferring the request to the home node, when said node controller is instructed from local cache;

b) determining the granularity depending on the sharing pattern and transferring the bulk data to the requesting node, when said home node receives the bulk request;

c) adding the two blocks into one buddy when said two adjacent blocks are owned to same node; and d) writing by said node controller only requested data in the cache line and the rest in local memory in order to use for future cache miss, when the data arrive.

2. The method of claim 1, after the step b), further comprising the step of dividing by said home node the block into two parts in order to reduce the false sharing when the ownership of said block is changed.

3. A bulk data communication method from local or remote nodes to home node for reading/writing data between memories using an Adaptive Granularity protocol to integrate fine and coarse communication in a distributed shared memory system in which a plurality of nodes are connected on interconnection network, and said respective node comprises processors with certain functions, memories, caches and node controllers for communicating data between said node and another nodes, comprising the states of:

INVALID state; READ TRANSIT state; WRITE TRANSIT state; READ ONLY state; and READ WRITE, wherein the state transits to said "INVALID" state when the cache line does not have the data to be referred (read/written) by processor, wherein a cache line fault handler requests bulk data transfer or fine data transfer to another node (remote computer or remote node), the state transits to said "READ TRANSIT" state when the cache has not the corresponding data block while said processor tries to read certain memory block, wherein said node cache controller sends Read Data Request (RREQ) to said home node and then the state transits to said "READ TRANSIT" state; the procedure is blocked in said "READ TRANSIT" state until the data for corresponding block are transferred; and the state of said cache line transits to said "READ ONLY" state when said home node has transferred the requested data and said data are loaded to said fault cache line, the state transits to said "WRITE TRANSIT" state when said cache has not the corresponding data block while said processor tries to write certain memory block, wherein said node cache controller sends Write Data Request (WREQ) to said home node and then the state transits to said "WRITE TRANSIT" state; the procedure is blocked in said "WRITE TRANSIT" state until the data for corresponding block are transferred; and the state of the cache line transits to said "READ WRITE" state when said home node has transferred the requested data and said data are loaded to the fault cache line, the state transits to said "READ ONLY" state when said home node has transferred the corresponding block in said "READ TRANSIT" state, wherein if the state of corresponding cache line is said "READ ONLY" state, it means that the memory data of home node are shared; and if another node attempts to write the same memory data of said home node and said home node requests INV request, then the state of corresponding line returns to said "INVALID" state, and the state transits to said "READ WRITE" state when said home node has transferred the corresponding block and write approval and then the data have been stored in the fault cache line in said "WRITE TRANSIT" state, wherein if the state of one cache line is said "READ WRITE" state, then said node has ownership for the memory data of home node; if another node requests to write said memory data of home node, then said home node sends INV request (invalidate request) to said node having said ownership and being in said "READ WRITE" state; and the INVALID requested node returns the state of the corresponding cache line to said "INVALID" state.

4. A bulk data communication method from home node to local or remote nodes for reading/writing data between memories using an Adaptive Granularity protocol to integrate fine and coarse communication in a distributed shared memory system in which a plurality of nodes are connected on interconnection network, and said respective node comprises processors with certain functions, memories, caches and node controllers for communicating data between said node and another nodes, comprising the states of EMPTY state; READ ONLY state; READ WRITE; READ TRANSIT state; and WRITE TRANSIT state, wherein the state transits to said "EMPTY" state when read/write request is sent to the home node, wherein said "EMPTY" state means the protocol state of directory when the page for requested data is referred; the home node refers to the directory having the corresponding data storing memory information, determines whether the corresponding data are bulk transfer data or fine transfer data depending on the information, sends first the requested cache line to the requesting node, and then transfers the rest data of said page as a sequence of cache lines, the state transits to said "READ ONLY" state after transferring the corresponding requested data, wherein the requested specific cache line size data are sent first to the node requesting said specific data in home node and the rest contents of the page including the requested specific data are transferred as a sequence of cache lines; if the RREQ for the same block is sent to said home node, then the directory for the requested data is referred and the corresponding cache line size block is transferred to the requester; and if the above requesting is for bulk data transfer, then the whole page including the block is sent to said requester, the state transits to said "READ WRITE" state when WREQ is transferred from another node in "READ ONLY" state, wherein, when the request to the home node in bulk data requesting, write data request WREQ requests the change of the data ownership; said home node transfers the half of the page including said data to the requester, so not only said requester has the ownership of the transferred half page, but also the data except for the requested cache line are used for future; INV (invalidate request) is sent to another node having the half of transferred block in order to maintain the cache coherency; and the state of home node transits from said "READ WRITE" state to said "EMPTY" state, the state transits to said "READ TRANSIT" state when said home node waiting ACKs receives the RREQ for the same block from another node, wherein said home node waits until it receives all ACKs; if the home node receives all ACKs for the invalidate requests, then the state transits to said "READ WRITE" state; and said home node handles the RREQ/WREQ received in said "READ TRANSIT" state, and the state transits to said "WRITE TRANSIT" state when said home node waiting ACKs receives the WREQ, wherein if said home node receives all ACKs for the invalidate requests, then said home node again handles the RREQ/WREQ received while it waits ACKs.

\* \* \* \* \*